US012585081B2

(12) United States Patent
He et al.

(10) Patent No.: US 12,585,081 B2
(45) Date of Patent: Mar. 24, 2026

(54) OPTICAL MODULE AND VIRTUAL REALITY (VR) DEVICE

(71) Applicant: Changzhou AAC Raytech Optronics Co., Ltd., Changzhou City (CN)

(72) Inventors: Fangjian He, Changzhou (CN); Xintong Hu, Changzhou (CN); Tianyu Wang, Changzhou (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 323 days.

(21) Appl. No.: 18/402,732

(22) Filed: Jan. 3, 2024

(65) Prior Publication Data

US 2024/0337808 A1 Oct. 10, 2024

Related U.S. Application Data

(63) Continuation of application No. PCT/CN2023/087404, filed on Apr. 10, 2023.

(51) Int. Cl.
G02B 7/04 (2021.01)
G02B 7/02 (2021.01)

(52) U.S. Cl.
CPC .............. G02B 7/04 (2013.01); G02B 7/021 (2013.01); G02B 7/022 (2013.01); G02B 7/023 (2013.01); G02B 7/026 (2013.01)

(58) Field of Classification Search
None
See application file for complete search history.

(56) References Cited

U.S. PATENT DOCUMENTS

2022/0113490 A1* 4/2022 Liu .......................... G02B 7/04

FOREIGN PATENT DOCUMENTS

CN 217718222 U * 11/2022

* cited by examiner

*Primary Examiner* — Phu Vu
(74) *Attorney, Agent, or Firm* — Wiersch Law Group

(57) ABSTRACT

The optical module includes a bracket component, a focusing component, a screen component, and a lens component. The bracket component further includes a position-limiting press plate and a screen bracket, and a guide groove. The focusing component further includes a lens tube and a focusing piece installed on the screen bracket by the position-limiting press plate. A spiral guide protrusion is formed on the focusing piece, a protrusion matched with the guide groove and a sliding groove are formed on the lens tube. The spiral guide protrusion is configured to rotate axially along the sliding groove on the lens tube, to enable the lens tube to move in the guide groove of the screen bracket along an optical axis, and the position-limiting press plate is configured to perform position limiting, to prevent the focusing element from moving along the optical axis, thereby achieving convenient focusing and a large focusing range.

18 Claims, 7 Drawing Sheets

100

13

21

22

11

9

23

OPTICAL MODULE AND VIRTUAL REALITY (VR) DEVICE

CROSS REFERENCE TO RELATED APPLICATIONS

The present application is a continuation of PCT Patent Application No. PCT/CN2023/087404, entitled "OPTICAL MODULE AND VIRTUAL REALITY (VR) DEVICE," filed Apr. 10, 2023, which is incorporated by reference herein in its entirety.

TECHNICAL FIELD

The embodiments of the present application relate to the technical field of display devices, in particular to an optical module and a virtual reality (VR) device.

BACKGROUND

In recent years, head-mounted VR products have been widely favored by consumers. A 3D virtual world implanted by a computer system is used to allows users to feel immersed in their surroundings and observe things in 3D space in real-time and without restrictions. For the same optical system, due to differences in consumer vision and usage habits, it is almost impossible to meet the needs of different populations without adjustment. Therefore, VR products should have the function of adjusting the focal length to meet consumer needs.

At present, some VR optical module structures in the related technologies have inconvenient internal lens focusing and a small adjustment range, mostly without focusing function, resulting in small variation of view angle and poor visual experience, thereby affecting the display effect and user experience of the VR device. Therefore, it is urgent to achieve the requirements of convenient focusing, large focusing range, and easy manufacturing and forming of structural components for a VR optical module.

Therefore, it is necessary to provide a new optical module and a VR device.

SUMMARY

An objective of the present application is to provide an optical module and a VR device, to solve the technical problems of small variation of view angle and poor visual experience in a VR optical module in the related technologies.

The technical solutions of the present application are as follows.

In a first aspect, an optical module applied to a VR device is provided according to the present application, and the optical module includes a bracket component, a focusing component rotatably arranged on the bracket component, a screen component fixed on the bracket component, and a lens component arranged within the focusing component.

The bracket component further includes a position-limiting press plate and a screen bracket, and a guide groove is formed on an inner wall of the screen bracket along a circumferential direction of the screen bracket.

The focusing component further includes a lens tube internally installed with the lens component and a focusing piece movably arranged on the lens tube, the focusing piece is installed on a surface of the screen bracket by the position-limiting press plate. A spiral guide protrusion is formed on an inner wall of the focusing piece, a protrusion matched with the guide groove and a sliding groove formed on the protrusion and matched with the spiral guide protrusion are formed on an outer wall of the lens tube along a circumferential direction of the lens tube.

The spiral guide protrusion of the focusing element is configured to rotate axially along the sliding groove on the lens tube, to enable the lens tube to move in the guide groove of the screen bracket along an optical axis, to change a distance between the screen component and the lens tube. The position-limiting press plate is configured to perform position limiting with the focusing element at an assembly point, to prevent the focusing element from moving along the optical axis.

As an improvement, the guide groove of the screen bracket is matched with the protrusion on the outer wall of the lens tube to form a gap between the inner wall of the screen bracket and the outer wall of the lens tube.

As an improvement, a first protrusion and a second protrusion with a height lower than the first protrusion are formed on end faces of the focusing element and the position-limiting press plate assembly along a circumferential direction, respectively. A position-limiting step is formed on an inner wall of the position-limiting press plate, and in response to the position-limiting press plate being assembled with the focusing element, the first protrusion is clamped on the position-limiting step, to prevent the focusing element from moving along the optical axis.

As an improvement, a lens tube cover provided with a buckle, and a buckle groove matched with the buckle is formed on the outer wall of the lens tube.

As an improvement, the lens component further includes a first lens, a second lens, and a third lens arranged sequentially along a direction from the lens tube cover to away from the lens tube, and the first lens, the second lens, and the third lens are fixedly connected to the lens tube, respectively.

As an improvement, the screen component further includes a screen fixed on the screen bracket and a bottom cover arranged on a side of the screen away from the screen bracket, and the bottom cover is fixedly connected to the screen bracket.

As an improvement, the screen component further includes an bonding component, and the screen is fixed to the screen bracket by the bonding component.

As an improvement, the screen component further includes a thermal conductive component arranged on a side of the screen close to the bottom cover.

As an improvement, the bracket component further includes a sealing piece arranged between the position-limiting press plate and the screen bracket.

In a second aspect, a VR device including the optical module according to any one of above is further provided according to the present application.

The advantageous effect of the present application is that the spiral guide protrusion of the focusing element rotates axially along the slide groove on the lens tube, to enable the lens tube to move in the guide groove of the screen bracket along an optical axis, to change a distance between the screen component and the lens tube, and form a position limiting at the assembly point between the position-limiting press plate and the focusing element, which prevents the rotating focusing element from moving along the optical axis, thereby achieving convenient focusing and a large focusing range, effectively solving the drawbacks of small variation range of view angle and poor visual experience of a VR optical module in the related technologies, while overcoming the difficulties in manufacturing and forming structural components, improving processing efficiency and reducing costs.

DETAILED DESCRIPTION

The present application is further described below in conjunction with the accompanying drawings and embodiments.

Figure 1:
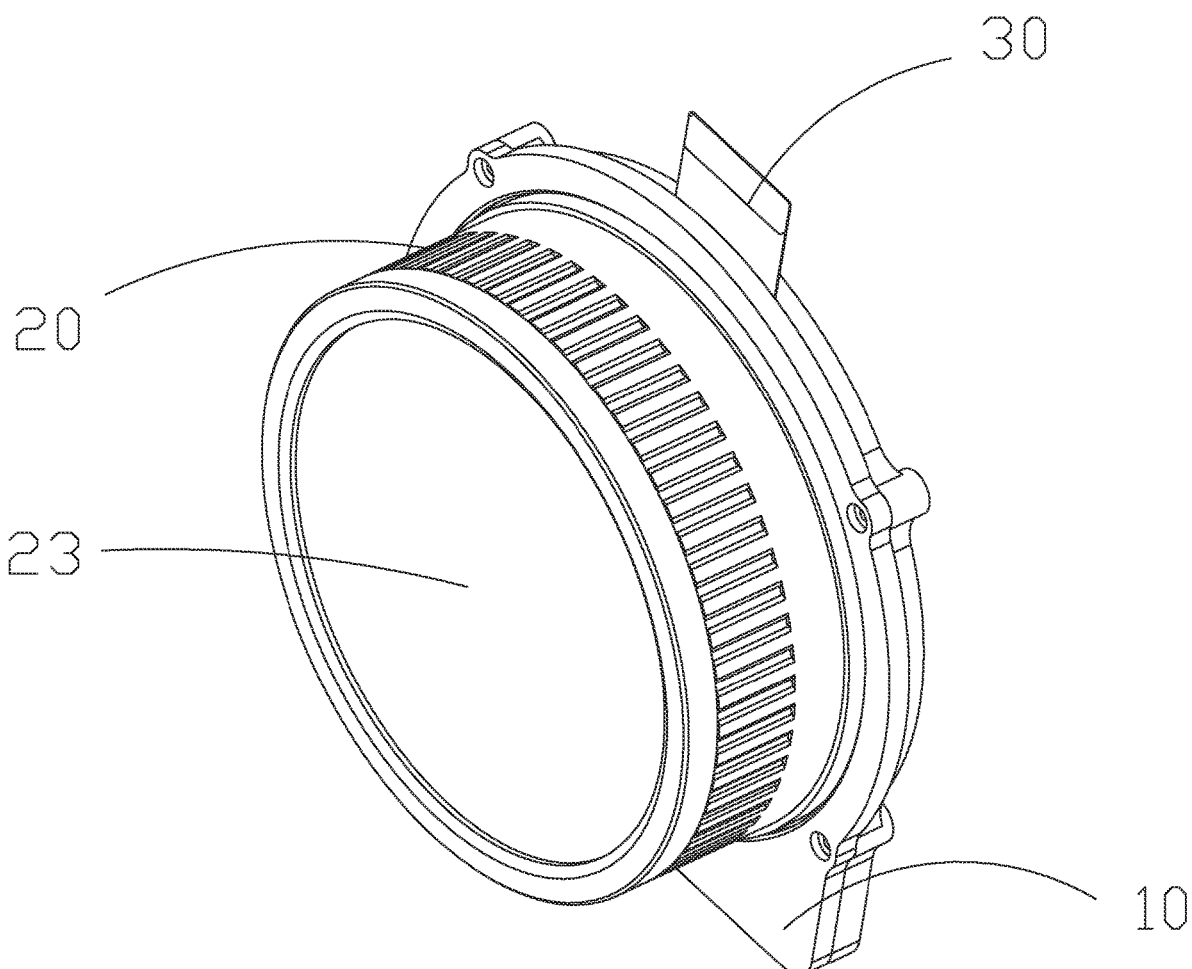
FIG. 1 is a schematic three-dimensional view of an optical module provided according to an embodiment of the present application.
Figure 2:
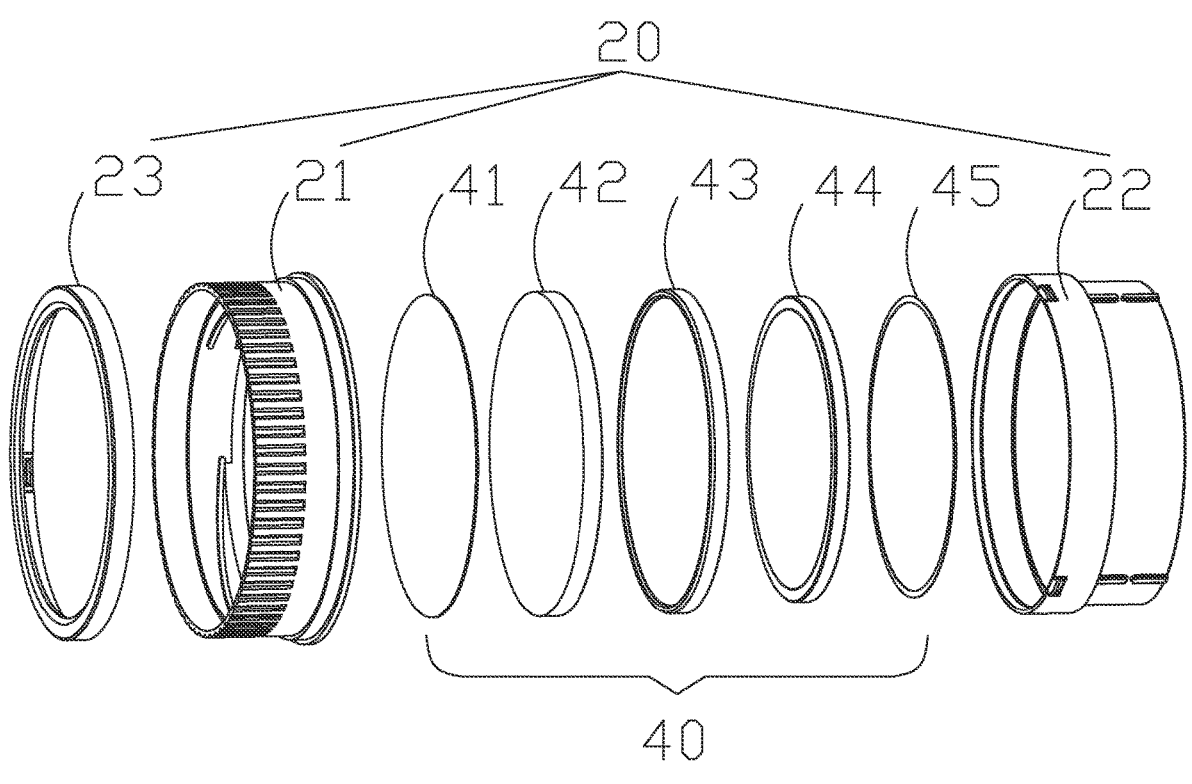
FIG. 2 is an explosive view of a focusing component and a lens component of the optical module shown in FIG. 1.
Figure 3:
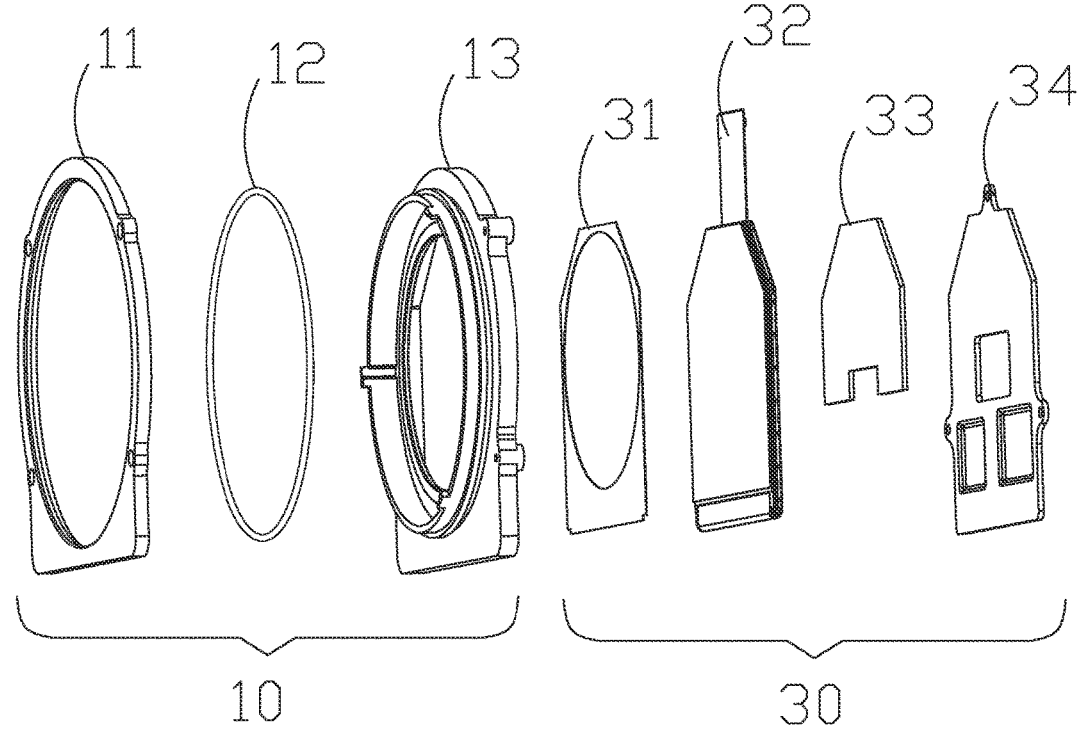
FIG. 3 is an explosive view of a bracket component and a screen component of the optical module shown in FIG. 1.

As shown in FIG. 1 to FIG. 3, an optical module 100 is provided according to the present application, and the optical module 100 includes a bracket component 10, a focusing component 20 rotatably arranged on the bracket component 10, a screen component 30 fixedly arranged on the bracket component 10, and a lens component 40 arranged within the focusing component 20.

Figure 4:
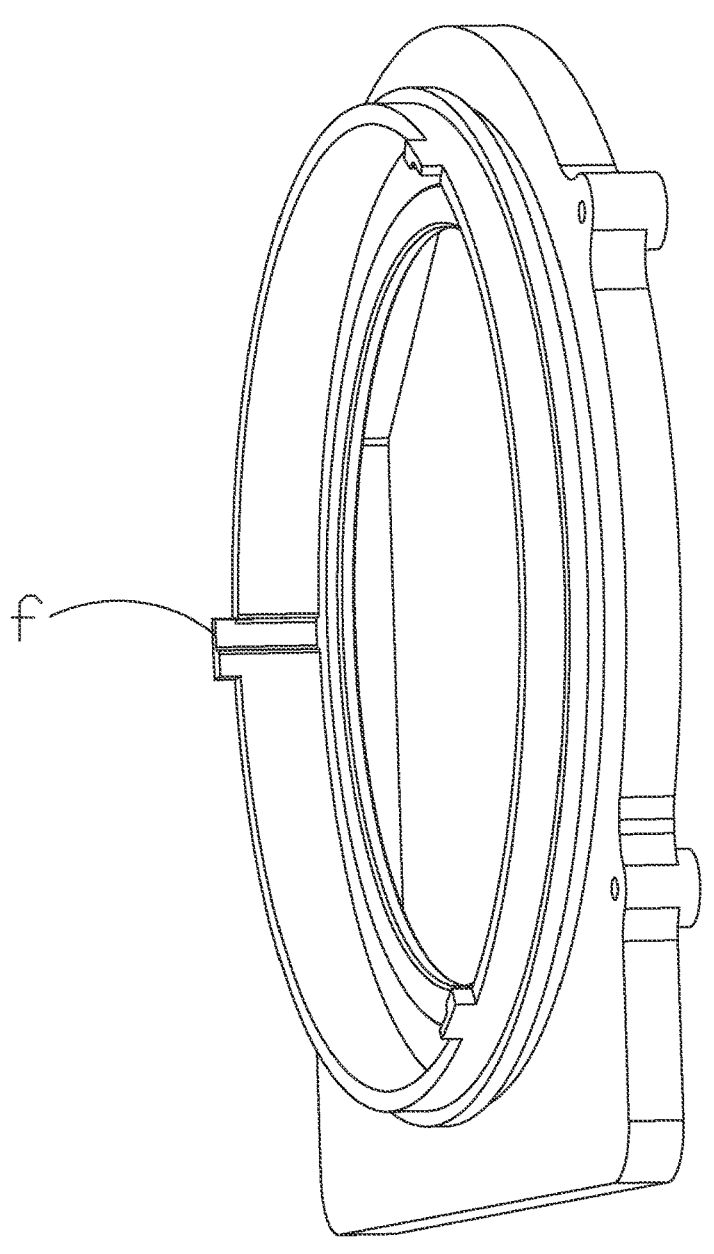
FIG. 4 is a schematic three-dimensional view of a screen bracket provided according to an embodiment of the present application.

Furthermore, referring to FIG. 3, the bracket component 10 further includes a position-limiting press plate 11, a screen bracket 13 for installing the screen component 30, and a sealing piece 12 between the position-limiting press plate 11 and the screen bracket 13. The position-limiting press plate 11 is fixedly connected to the screen bracket 13 by screws. The sealing piece 12 is installed on the screen bracket 13 to prevent dust and change friction, and the sealing piece 12 is preferably embodied as a sealing ring. Furthermore, as shown in FIG. 4, a guide groove f is formed on the inner wall of the screen bracket 13 along a circumferential direction of the inner wall of the screen bracket 13. The number of guide grooves f may be three, and multiple guide grooves f are evenly distributed along the circumferential direction on the inner wall of the screen bracket 13.

Figure 5:
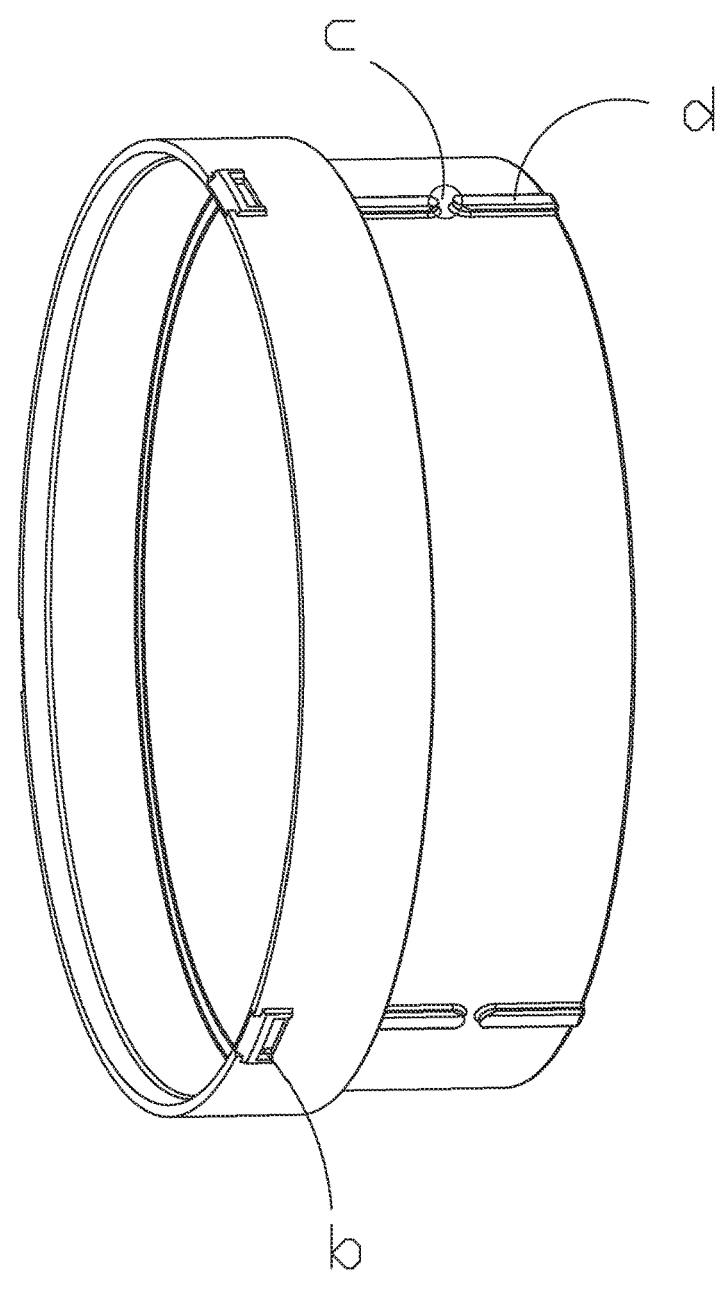
FIG. 5 is a schematic three-dimensional view of a lens tube provided according to an embodiment of the present application.
Figure 6:
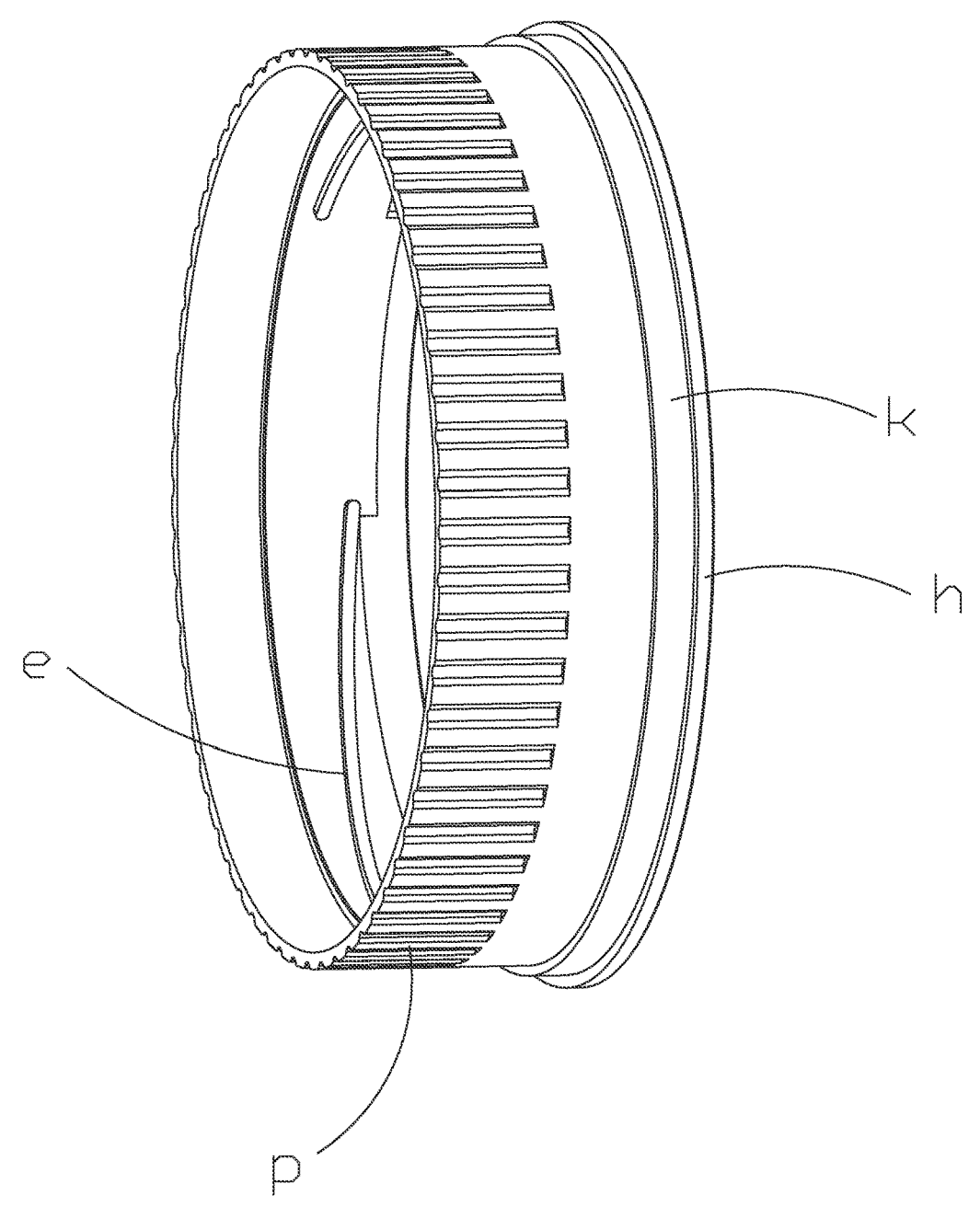
FIG. 6 is a schematic three-dimensional view of a focusing element provided according to an embodiment of the present application.

Furthermore, referring to FIG. 2, the focusing component 20 further includes a lens tube 21 with an internally installed lens component 40 and a focusing element 22 that is movable on the lens tube 21. The focusing element 22 is installed on the surface of the screen bracket 13 by a position-limiting press plate 11, and the focusing element 22 is configured to focus by changing a distance between the lens tube 21 and the screen. Furthermore, as shown in FIG. 6, a spiral guide protrusion e is formed on the inner wall of the focusing element 22, and preferably, three spiral guide protrusions e are arranged. An etching pattern p is formed on the outer wall of the focusing element 22, which provides anti slip effect and prevents the focusing element 22 from slipping during rotation. Furthermore, as shown in FIG. 5, a protrusion d matched with the guide groove f and a sliding groove c formed on the protrusion d and matched with the spiral guide protrusion e are formed on an outer wall of the lens tube 21 along a circumferential direction of the lens tube 21.

The optical module 100 rotates axially along the sliding groove c on the lens tube 21 by the spiral guide protrusion e of the focusing element 22, to enable the lens tube 21 to move in the guide groove f of the screen bracket 13 along an optical axis, to change a distance between the screen component 30 and the lens tube 21, and form a position limiting at the assembly point between the position-limiting press plate 11 and the focusing element 22, which prevents the rotating focusing element 22 from moving along the optical axis, and achieves focusing, thereby achieving convenient focusing and a large focusing range, and allowing users to obtain more information and enrich their visual experience through their eyes. In addition, it should be noted that the rotation angle of the focusing element 22 of the present application is in the range of 0 to 70 degrees, so that a movement between the lens tube 21 and the screen is within the range of 0 to 3.5 mm. Compared with the existing 3P Pancake focusing VR optical module, the present application has the advantages of lighter weight and smaller size, further improving the user experience of the product.

In an implementable embodiment, the guide groove f of the screen bracket 13 is in a clearance fit with the protrusion d on the outer wall of the lens tube 21 to create a gap between the inner wall of the screen bracket 13 and the outer wall of the lens tube 21. Preferably, a unilateral clearance between the inner wall of the lens tube 21 and the screen bracket 13 is designed to be 0.1 mm, so that the inner wall of the lens tube 21 will not scratch with the screen bracket 13, thereby improving the yield of the product.

Figure 7:
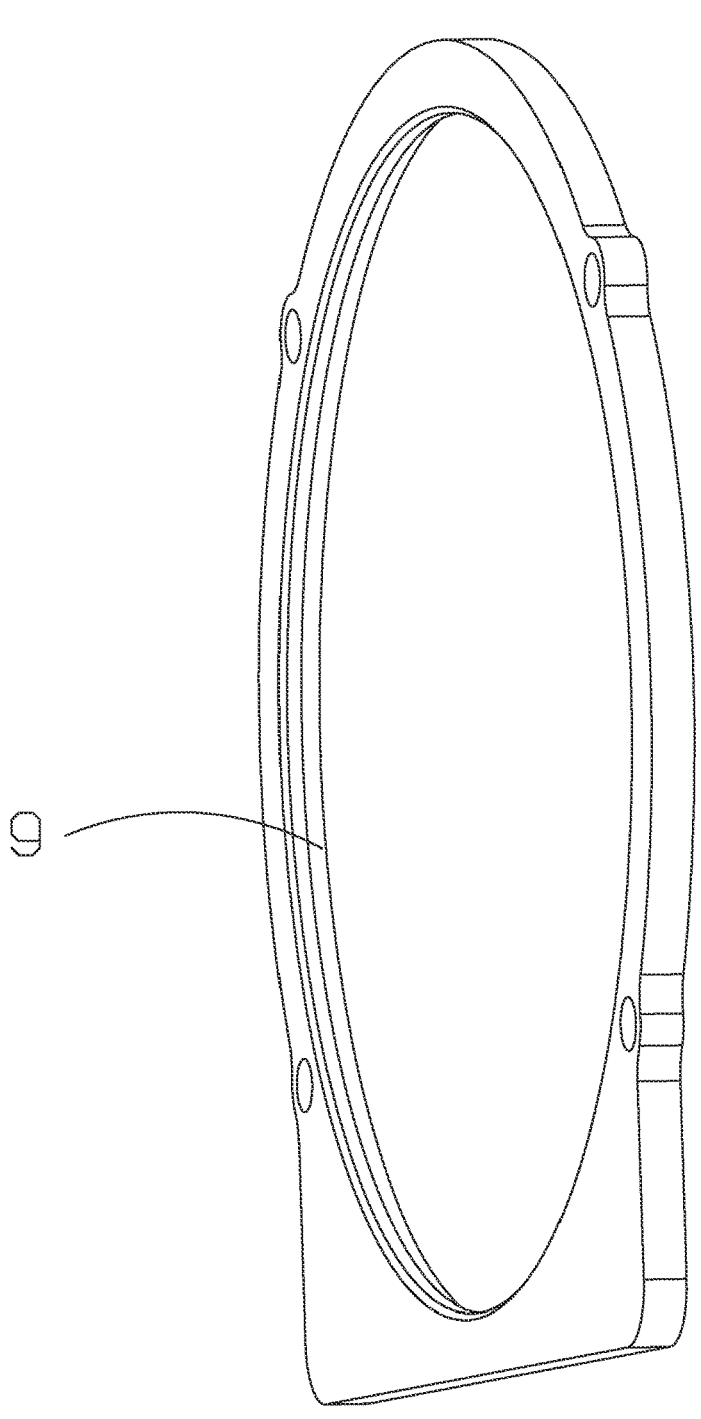
FIG. 7 is a schematic three-dimensional view of a position-limiting press plate provided according to an embodiment of the present application.

In an implementable embodiment, as shown in FIG. 6, a first protrusion h and a second protrusion k with a height lower than the first protrusion h are formed on end faces of the focusing element 22 and the position-limiting press plate 11 along a circumferential direction, respectively. Referring to FIG. 7, a position-limiting step g is formed on an inner wall of the position-limiting press plate 11, and in response to the position-limiting press plate 11 being assembled with the focusing element 22, the first protrusion h is clamped on the position-limiting step g, to prevent the focusing element 22 from moving along the optical axis.

Figure 8:
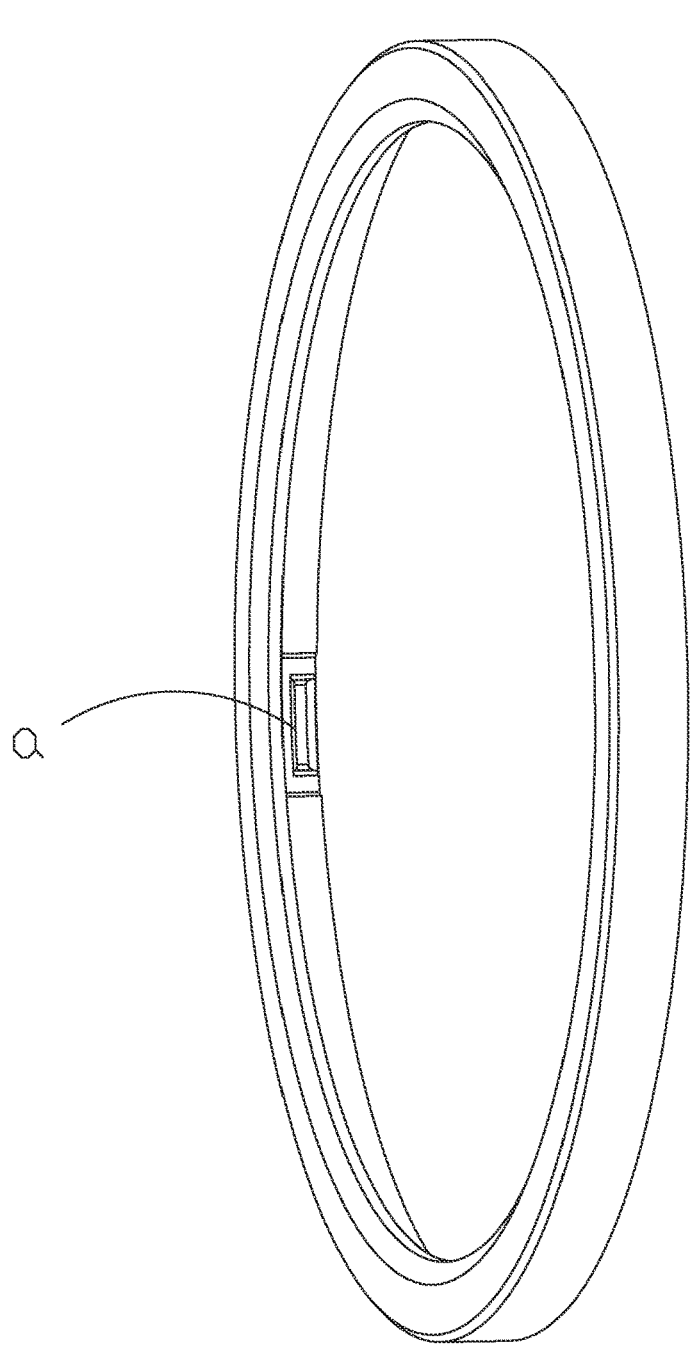
FIG. 8 is a schematic three-dimensional view of a lens tube cover provided according to an embodiment of the present application.

In an implementable embodiment, referring to FIG. 2 and FIG. 8, the focusing component 20 further includes a lens tube cover 23 configured to protect the lens component 40 installed in the lens tube 21. The lens tube cover 23 is provided with a buckle a, and a buckle groove b that matches the buckle a is formed on the outer wall of the lens tube 21. The number of buckles a may be set to one or more, and the buckle grooves b are in a one-to-one correspondence with the buckles a. Preferably, the number of buckles a is one or two, which facilitates disassembly. The lens tube cover 23 is configured to protect the lens component 40 inside the lens tube 21 from external environmental pollution during non-operating times, thereby extending the service life of the optical module 100 and improving the user experience.

In an implementable embodiment, referring to FIG. 1 to FIG. 2, the lens component 40 further includes a first lens 42, a second lens 43, and a third lens 44 arranged sequentially along a direction from the lens tube cover 23 to away from the lens tube 21. The first lens 42, the second lens 43, and the third lens 44 are fixedly connected to the lens tube 21, respectively. During installation, a composite film 41 is attached to the first lens 42, a double-sided adhesive 45 is installed at a corresponding position of the lens tube 21, and the third lens 44 is fixed to the lens tube 21 by the double-sided adhesive 45 and kept under pressure. Furthermore, the second lens 43 is installed in the lens tube 21 and fixed by bonding with the lens tube 21 through UV adhesive. Furthermore, the first lens 42, which has been coated with the composite film 41, is installed in the lens tube 21 and bonded with the lens tube 21 by the UV adhesive.

In an implementable embodiment, referring to FIG. 1 to FIG. 3, the screen component 30 further includes a adhesive piece 31 fixed to the screen bracket 13, a screen 32 fixed to the screen bracket 13 by the adhesive piece 31, a thermal conductive element 33 arranged on a side of the screen 32 away from the screen bracket 13, and a bottom cover 34 fixedly connected to the screen bracket 13. The bonding component 31 is a sticky material, such as a double-sided adhesive for the screen, and the thermal conductive component 33 is a material with thermal conductivity, such as a thermal conductive silicone pad. The thermal conductive component 33 is arranged at a rear end of the screen 32 to facilitate heat dissipation.

Referring to FIG. 1 to FIG. 3, the optical module 100 in this embodiment is installed as follows: the composite film 41 is attached to the first lens 42, the double-sided adhesive 45 is installed at the corresponding position of the lens tube 21. Furthermore, the third lens 44 is fixed with the lens tube 21 by the double-sided adhesive 45 and kept under pressure, the second lens 43 is installed in the lens tube 21 and fixed by bonding with the lens tube 21 using UV adhesive. Furthermore, the first lens 42, which has been coated with the composite film 41, is installed in the lens tube 21 and fixed by bonding with the lens tube 21 using UV adhesive. The spiral guide protrusion e of the focusing element 22 is matched with the sliding groove c of the lens tube 21 in a clearance fit and in a one-to-one correspondence. Furthermore, the sealing piece 12 is installed on the screen bracket 13 and lubricating grease is applied on a surface of the sealing piece 12 to reduce the friction between the focusing element 22 and the sealing piece 12. Furthermore, the protrusion d of the lens tube 21 in installed corresponding to the guide groove f of the screen bracket 13. The focusing element 22 is position-limited by the position-limiting press plate 11, and the first protrusion h of the focusing element 22 is clamped on the position-limiting step g of the position-limiting press plate 11. The position-limiting press plate 11 is fixed to the screen bracket 13 by screws. Furthermore, the lens tube cover 23 is installed on the front end of the lens tube 21, and the buckles a of the lens tube cover 23 is position-limited by the buckle grooves b of the lens tube 21. The adhesive piece 31 is attached to the inner surface of the screen bracket 13, and the screen 32 is bonded and fixed inside the screen bracket 13 by the adhesive piece 31. Furthermore, the thermal conductive element 33 is attached to the rear end of the screen 32 to increase heat dissipation, and the bottom cover 34 and screen bracket 13 are fixed with screws.

A VR device is further provided according to the embodiments of the present application, and the VR device includes the optical module 100 mentioned above. The specific structure of the optical module 100 refers to the above embodiments. As the VR device adopts all the technical solutions of the above embodiments, the VR device has at least all the advantageous effects brought by the technical solutions of the above embodiments, which will not be repeated here.

The above are only the embodiments of the present application. It should be pointed out that for those of ordinary skill in the art, improvements may be made without departing from the inventive concept of the present application, and the improvements shall fall with the scope of protection of the present application.

What is claimed is:

1. An optical module applied to a virtual reality (VR) device, comprising a bracket component, a focusing component rotatably arranged on the bracket component, a screen component fixed on the bracket component, and a lens component arranged within the focusing component;

wherein the bracket component further comprises a position-limiting press plate and a screen bracket, and a guide groove is formed on an inner wall of the screen bracket along a circumferential direction of the screen bracket;

wherein the focusing component further comprises a lens tube internally installed with the lens component and a focusing piece movably arranged on the lens tube, the focusing piece is installed on a surface of the screen bracket by the position-limiting press plate, a spiral guide protrusion is formed on an inner wall of the focusing piece, a protrusion matched with the guide groove and a sliding groove formed on the protrusion and matched with the spiral guide protrusion are formed on an outer wall of the lens tube along a circumferential direction of the lens tube;

wherein the spiral guide protrusion of the focusing element is configured to rotate axially along the sliding groove on the lens tube, to enable the lens tube to move in the guide groove of the screen bracket along an optical axis, to change a distance between the screen component and the lens tube, and the position-limiting press plate is configured to perform position limiting with the focusing element at an assembly point, to prevent the focusing element from moving along the optical axis.

2. The optical module according to claim 1, wherein the guide groove of the screen bracket is matched with the protrusion on the outer wall of the lens tube to form a gap between the inner wall of the screen bracket and the outer wall of the lens tube.

3. The optical module according to claim 1, wherein a first protrusion and a second protrusion with a height lower than the first protrusion are formed on end faces of the focusing element and the position-limiting press plate assembly along a circumferential direction, respectively, a position-limiting step is formed on an inner wall of the position-limiting press plate, and in response to the position-limiting press plate being assembled with the focusing element, the first protrusion is clamped on the position-limiting step, to prevent the focusing element from moving along the optical axis.

4. The optical module according to claim 1, wherein the focusing component further comprises a lens tube cover provided with a buckle, and a buckle groove matched with the buckle is formed on the outer wall of the lens tube.

5. The optical module according to claim 2, wherein the lens component further comprises a first lens, a second lens, and a third lens arranged sequentially along a direction from the lens tube cover to away from the lens tube, and the first lens, the second lens, and the third lens are fixedly connected to the lens tube, respectively.

6. The optical module according to claim 1, wherein the screen component further comprises a screen fixed on the screen bracket and a bottom cover arranged on a side of the screen away from the screen bracket, and the bottom cover is fixedly connected to the screen bracket.

7. The optical module according to claim 6, wherein the screen component further comprises a bonding component, and the screen is fixed to the screen bracket by the bonding component.

8. The optical module according to claim 7, wherein the screen component further comprises a thermal conductive component arranged on a side of the screen close to the bottom cover.

9. The optical module according to claim 1, wherein the bracket component further comprises a sealing piece arranged between the position-limiting press plate and the screen bracket.

10. A VR device, comprising the optical module according to claim 1.

11. A VR device, comprising the optical module according to claim 2.

12. A VR device, comprising the optical module according to claim 3.

13. A VR device, comprising the optical module according to claim 4.

14. A VR device, comprising the optical module according to claim 5.

15. A VR device, comprising the optical module according to claim 6.

16. A VR device, comprising the optical module according to claim 7.

17. A VR device, comprising the optical module according to claim 8.

18. A VR device, comprising the optical module according to claim 9.

* * * * *